(12) United States Patent  
Miao

(10) Patent No.: US 12,219,387 B2  
(45) Date of Patent: Feb. 4, 2025

(54) ADAPTATION LAYER ENHANCEMENT IN RELAY NETWORKS

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 17/439,661

(22) PCT Filed: May 8, 2020

(86) PCT No.: PCT/US2020/032152  
§ 371 (c)(1),  
(2) Date: Sep. 15, 2021

(87) PCT Pub. No.: WO2020/227653  
PCT Pub. Date: Nov. 12, 2020

(65) Prior Publication Data  
US 2022/0159508 A1    May 19, 2022

Related U.S. Application Data

(60) Provisional application No. 62/844,974, filed on May 8, 2019.

(51) Int. Cl.  
*H04W 28/06* (2009.01)  
*H04L 69/04* (2022.01)  
(Continued)

(52) U.S. Cl.  
CPC ............. *H04W 28/06* (2013.01); *H04L 69/04* (2013.01); *H04W 76/12* (2018.02); *H04W 88/14* (2013.01)

(58) Field of Classification Search  
CPC ..... H04W 28/06; H04W 76/12; H04W 88/14; H04W 88/085; H04W 40/22;  
(Continued)

(56) References Cited

U.S. PATENT DOCUMENTS

2009/0207854 A1* 8/2009 Blanchard ............... H04L 69/04  
370/477  
2010/0208798 A1* 8/2010 Melpignano ......... H04N 19/503  
375/240.07  
(Continued)

FOREIGN PATENT DOCUMENTS

CN          1949747       4/2007  
EP          3468236 A1 *  4/2019  ......... H04L 12/1407  
(Continued)

OTHER PUBLICATIONS

3GPP TR 38.874 V16.0.0 (Dec. 2018), "3rd Generation Partnership Project; Technical Specification Group Radio Access Network; NR; Study on Integrated Access and Backhaul; (Release 16)," Dec. 2018.

(Continued)

*Primary Examiner* — Thai Nguyen  
(74) *Attorney, Agent, or Firm* — Fish & Richardson P.C.

(57) ABSTRACT

Disclosed are methods, systems, apparatus, and computer programs for adaptation layer enhancements in new radio (NR) integrated access and backhaul (IAB) networks. In one aspect, a method includes performing, by an adaptation layer of an IAB node of the IAB network, header compression on one or more headers of a packet for transmission in the IAB network; and transmitting the packet with the one or more compressed headers to a destination IAB node of the IAB network.

17 Claims, 9 Drawing Sheets

(51) Int. Cl.
*H04W 76/12* (2018.01)
*H04W 88/14* (2009.01)

(58) Field of Classification Search
CPC ........ H04W 80/02; H04L 69/04; H04L 69/22; H04L 47/34; H04L 69/321; H04B 7/15528
See application file for complete search history.

(56) References Cited

U.S. PATENT DOCUMENTS

| | | | |
|---|---|---|---|
| 2015/0326695 A1 | 11/2015 | Pang et al. | |
| 2018/0092139 A1* | 3/2018 | Novlan | H04W 8/005 |
| 2018/0213065 A1* | 7/2018 | Pang | H04L 69/04 |
| 2019/0215055 A1* | 7/2019 | Majmundar | H04W 40/22 |
| 2021/0092667 A1* | 3/2021 | Zhu | H04W 40/24 |

FOREIGN PATENT DOCUMENTS

| | | | | |
|---|---|---|---|---|
| WO | WO-0048374 A1 * | 8/2000 | | G06Q 20/04 |
| WO | WO 2010/118431 | 10/2010 | | |

OTHER PUBLICATIONS

Huawei et al., "Header compression in adaptation layer," 3GPP TSG-RAN WG2 Meeting #105bis, R2-1903979, Xi'an, China, Apr. 8-12, 2019, 2 pages.

PCT International Preliminary Report on Patentability in International Application No. PCT/US2020/032152, dated Nov. 2, 2021, 7 pages.

PCT International Search Report and Written Opinion in International Application No. PCT/US2020/032152, dated Aug. 6, 2020, 14 pages.

\* cited by examiner

ADAPTATION LAYER ENHANCEMENT IN RELAY NETWORKS

CLAIM OF PRIORITY

This application is a U.S. National Phase Application under 35 U.S.C. § 371 and claims the benefit of priority to International Application No. PCT/US2020/032152, filed on May 8, 2020, which claims priority to U.S. Provisional Patent Application No. 62/844,974 filed May 8, 2019, entitled "METHODS FOR ADAPTATION LAYER ENHANCEMENT IN RELAY NETWORK," the entirety of which is incorporated herein by reference.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for adaptation layer enhancements in new radio (NR) integrated access and backhaul (IAB) networks.

In accordance with one aspect of the present disclosure, a method includes performing, by an adaptation layer of an IAB node of the IAB network, header compression on one or more headers of a packet for transmission in the IAB network; and transmitting the packet with the one or more compressed headers to a destination IAB node of the IAB network.

Other versions include corresponding systems, apparatus, and computer programs to perform the actions of methods defined by instructions encoded on computer readable storage devices. These and other versions may optionally include one or more of the following features.

In some implementations, the packet is transmitted via a user equipment (UE) bearer, and the IAB network implements UE bearer to backhaul channel mapping and routing.

In some implementations, the one or more headers are at least one of a General Packet Radio Service ((GPRS) Tunneling Protocol (GTP) header, a User Datagram Protocol (UDP) header, or an Internet Protocol (IP) header.

In some implementations, performing header compression on the one or more headers includes compressing a message type field in the one or more headers.

In some implementations, the header compression is based on a Robust Header Compression (ROHC) framework, and the header compression is performed using an ROHC compression profile.

In some implementations, performing header compression on the one or more headers includes: determining a load status of the IAB network with respect to a number of contexts required by UE bearers served by the IAB network; and determining, based on the load status, a context identifier of an ROHC channel, wherein a number of bits of the context identifier is one of 8 bits, 16 bits, or 24 bits.

In some implementations, an ROHC channel corresponds to an end-to-end backhaul link between the IAB node and the destination IAB node, and the process further includes: determining, based on the context identifier, a routing path ID of the end-to-end backhaul link, wherein the routing path ID identifies each hop in the end-to-end backhaul link between the IAB node and the destination IAB node.

In some implementations, the packet is transmitted over an end-to-end backhaul link between an IAB-Donor and an IAB access node, the IAB node is one of the IAB-Donor and the IAB access node, and the destination IAB node is the other one of the IAB-Donor and the IAB access node.

In some implementations, the IAB network further includes an intermediate node between the IAB-Donor and the IAB access node, and the process further includes: routing the packet through adaptation layers of the intermediate IAB node and the IAB-Donor node, where the packet is routed through the adaptation layers without going through the upper Internet Protocol (IP) layer.

In some implementations, the one or more headers are at least one of a User Datagram Protocol (UDP) header or an Internet Protocol (IP) header, and the header compression of the UDP header or the IP header is UDP/IP header compression that uses a Robust Header Compression (ROHC) framework.

In some implementations, the one or more headers further include a General Packet Radio Service (GPRS) Tunneling Protocol (GTP) header, and the UDP/IP header compression is aggregated with GTP header compression.

In some implementations, the process further includes: categorizing GTP header fields based on the ROHC framework by assigning each GTP header field to one of the following categories: INFERRED, STATIC, STATIC-DEF, STAT-KNOWN, and CHANGING.

In some implementations, the header compression is configured independently over a respective backhaul link in each hop between the IAB node and the destination IAB node.

In some implementations, the process further includes determining respective compression efficiencies for the backhaul links between the IAB node and the destination IAB node.

In some implementations, the process further includes determining, based the respective compression efficiency of a first backhaul link, whether to perform header compression over the first backhaul link.

DESCRIPTION OF DRAWINGS

Like reference numbers and designations in the various drawings indicate like elements.

DETAILED DESCRIPTION

Figure 1:
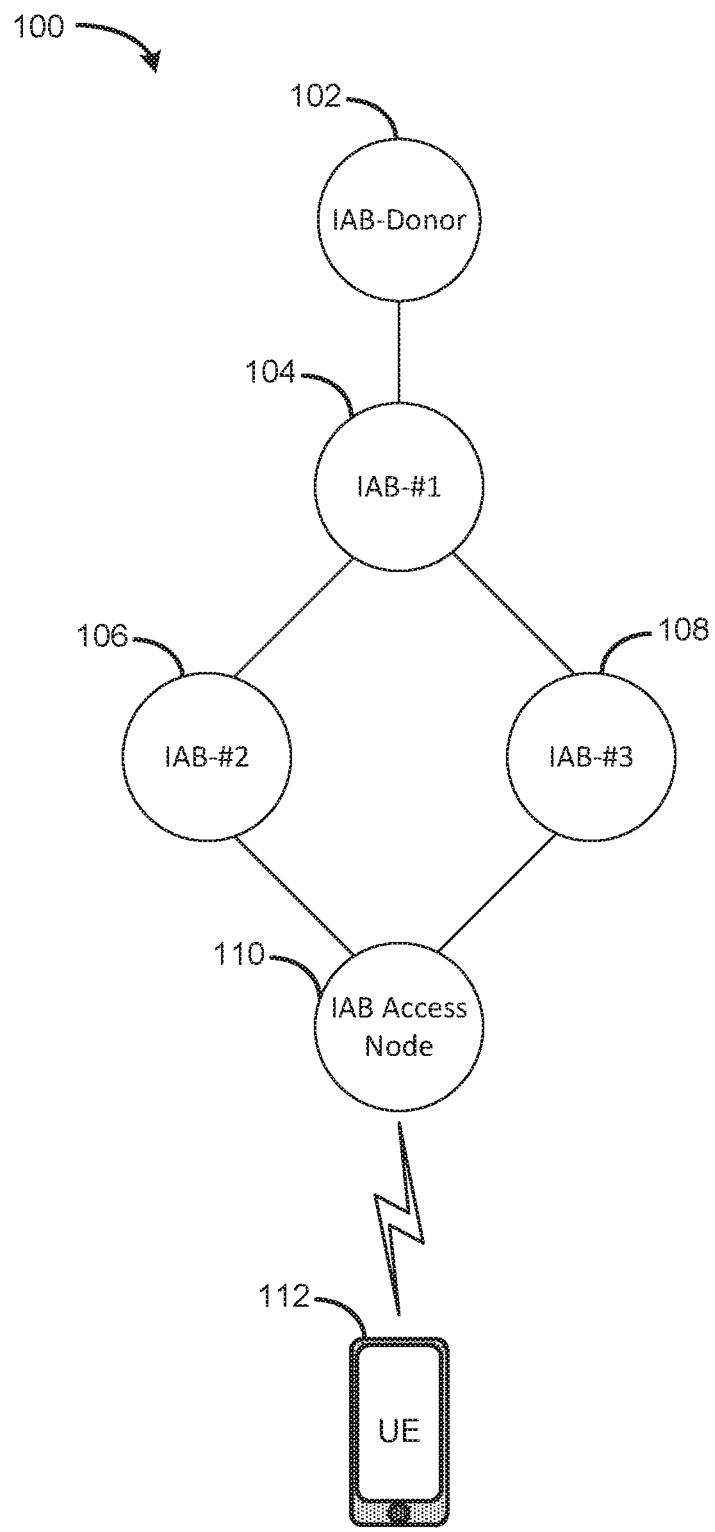
FIG. 1 illustrates an example integrated access and backhaul (IAB) network, according to some implementations of the present disclosure.

The present disclosure is related to Integrated Access and Backhaul (IAB) networks, which is a feature that enables multi-hop routing (e.g. as described in 3GPP Release 16 (Rel-16)). An architecture of IAB networks generally includes an IAB-Donor node (or "IAB-Donor") that serves a plurality of IAB nodes that operate as relays. The IAB-Donor is a network node (e.g., a base station) that terminates new generation (NG) interfaces In particular, the IAB-Donor may serve as an interface for a user equipment (UE) to a core network and/or may provide wireless backhauling functionality to the plurality of IAB nodes. The plurality of IAB nodes can serve as access nodes to UEs and can provide backhaul links to other IAB nodes.

IAB support in new radio (NR) may include enhancements to wireless transport by introducing a layer called an "adaptation layer," which is located above the radio link control (RLC) layer. One of the functionalities of the adaptation layer is to forward the traffic across wireless backhaul (BH) links of an IAB network. For this purpose, the adaptation layer may include an identifier depending on the data forwarding that will be executed. This identifier could, for example, be a path identifier (ID) that is indicative of an entire backhaul path between an IAB-Donor and an IAB access node. As such, this identifier may be used within the IAB network (e.g. under one donor central unit (CU)) and the same identifier may be reused in another IAB network.

According to the existing protocol stack architecture of IAB networks, IAB networks may transmit General Packet Radio Services (GPRS) Tunneling Protocol/User Datagram Protocol/Internet Protocol (GTP/UDP/IP) based encapsulated IP packets. In this architecture, the adaptation layer of the IAB nodes is responsible for routing and data forwarding. However, the existing architecture does not account for limited radio resources. Due to their limited nature, it is important to efficiently utilize backhaul radio resources.

This disclosure describes an enhancement for backhaul packet transmission that enables efficient utilization of backhaul radio resources. Specifically, this disclosure describes methods and systems that employ header compression for backhaul packets in order to further enhance the spectrum efficiency of BH communications. The header compression functions may be applied in the adaptation layer of one or more IAB nodes of the IAB network. This enhancement is particularly useful when the IAB network is delivering a large amount of small backhaul packets.

In a first method, header compression is applied over an end-to-end backhaul link between an IAB-Donor and an IAB access node. In this method, the IAB access node and the IAB-Donor have access to different layers of GTP/UDP/IP based backhaul packets. As such, backhaul layer headers (e.g., GTP, UDP, and IP) can be compressed so as to enhance the backhaul spectrum efficiency. In a first implementation of the method, a Robust Header Compression (ROHC) framework is used to compress UDP and IP headers based on ROHC UDP/IP compression profiles (e.g., defined in RFC 3095, RFC 4815 and RFC 5225). In a second implementation of the method, an ROHC profile used for UDP/IP header compression is further aggregated by GTP header compression.

In a second method, header compression as applied per backhaul link between adjacent IAB nodes in the IAB network. In this method, header compression is configured independently over the backhaul channel (also called a "backhaul link) in each hop of the IAB network. However, because intermediate IAB nodes and the IAB-Donor distributed unit (DU) only have access to the IP layer of the backhaul traffic flows, only IP header compression is performed. In particular, the adaptation layer of each IAB node can perform IP header compression, perhaps based on RFC 3843, RFC 4815 and RFC 5225. In some examples, whether header compression is performed for a particular backhaul link (e.g., between adjacent IAB nodes) may depend on the achievable compression efficiency for that backhaul channel.

Both of these methods enable header compression functionalities in the adaptation layer of IAB nodes so that the backhaul spectrum efficiency can be improved, particularly for small backhaul packet transmission in the IAB network. Note that, in some implementations, a data transmission is considered a small packet if the data does not exceed a predetermined threshold, e.g., transmissions that are less than N bytes, where N is a predetermined value, e.g., 100, 128, 256, 512, and 1024. Other values for N are possible. Also note that although this disclosure generally describes header compression, the disclosed methods and systems can also be configured for header decompression.

FIG. 1 illustrates an example IAB network 100, according to some implementations. As shown in FIG. 1, the IAB network 100 includes IAB-Donor 102 and four children nodes. The four children nodes three intermediate IAB nodes 104 ("IAB-#1") 106 ("IAB-#2"), and 109 ("IAB-#3"). Additionally, the children nodes also include an IAB access node 110 that serves a user equipment (UE) 112. In this example, IAB-#1 is a parent of IAB-#2 and IAB-#3. Conversely, IAB-#2 and IAB-#3 are both children of IAB-#1. IAB-#2 and IAB-#3 are both parents of IAB access node 112. IAB access node 112 is a child of IAB-#2 and IAB-#3. Further, the IAB network 100 may have a network architecture that includes a central unit-distributed unit (CU-DU) split In this architecture, the IAB-Donor 102 includes a central unit and a distributed unit (not illustrated in FIG. 1). Furthermore, each IAB node holds a DU and a Mobile Termination (MT) function. Generally, an IAB node may use the MT function to connect to its parent IAB node or the IAB-Donor 102. And an IAB node may use the DU function to communicate with UEs and MTs of child IAB nodes. In an example, to the IAB network 100 may implement UE barer (based on tunnel-endpoint ID (TEID)) to backhaul channel mapping and routing.

In an embodiment, in addition to UE bearer to backhaul channel mapping and routing, an adaptation layer in the IAB nodes can be enhanced to include a header compression (HC) function in order to improve the spectrum efficiency of backhaul link communication in the IAB network. In particular, header compression can be performed between different peer-entities in the IAB network. Disclosed are two methods of header compression that can be implemented in the IAB network.

Method 1: Header Compression Ever End-to-End Backhaul Link Between IAB-Donor CU and IAB-Access Mode In a first method, header compression is applied over an end-to-end backhaul (E2E) link between IAB-Donor CU and IAB access node. The IAB access node and the IAB- Donor have access to different layers of GTP/UDP/IP based backhaul UE packets. As such, in this method, the backhaul layer headers (e.g., GTP, UDP, and IP) are compressed so as to enhance backhaul spectrum efficiency. This is particular useful when the IAB network delivers low latency critical data with medium to small payload size.

In an implementation of the first method, a Robust Header Compression (ROHC) framework is used by an adaptation layer (of the IAB access node or the IAB-Donor) to compress UDP and/or IP headers by virtue of ROHC UDP/IP compression profiles, such as the ROHC profiles defined in RFC 3095, RFC 4815 or RFC 5225.

Figure 2:
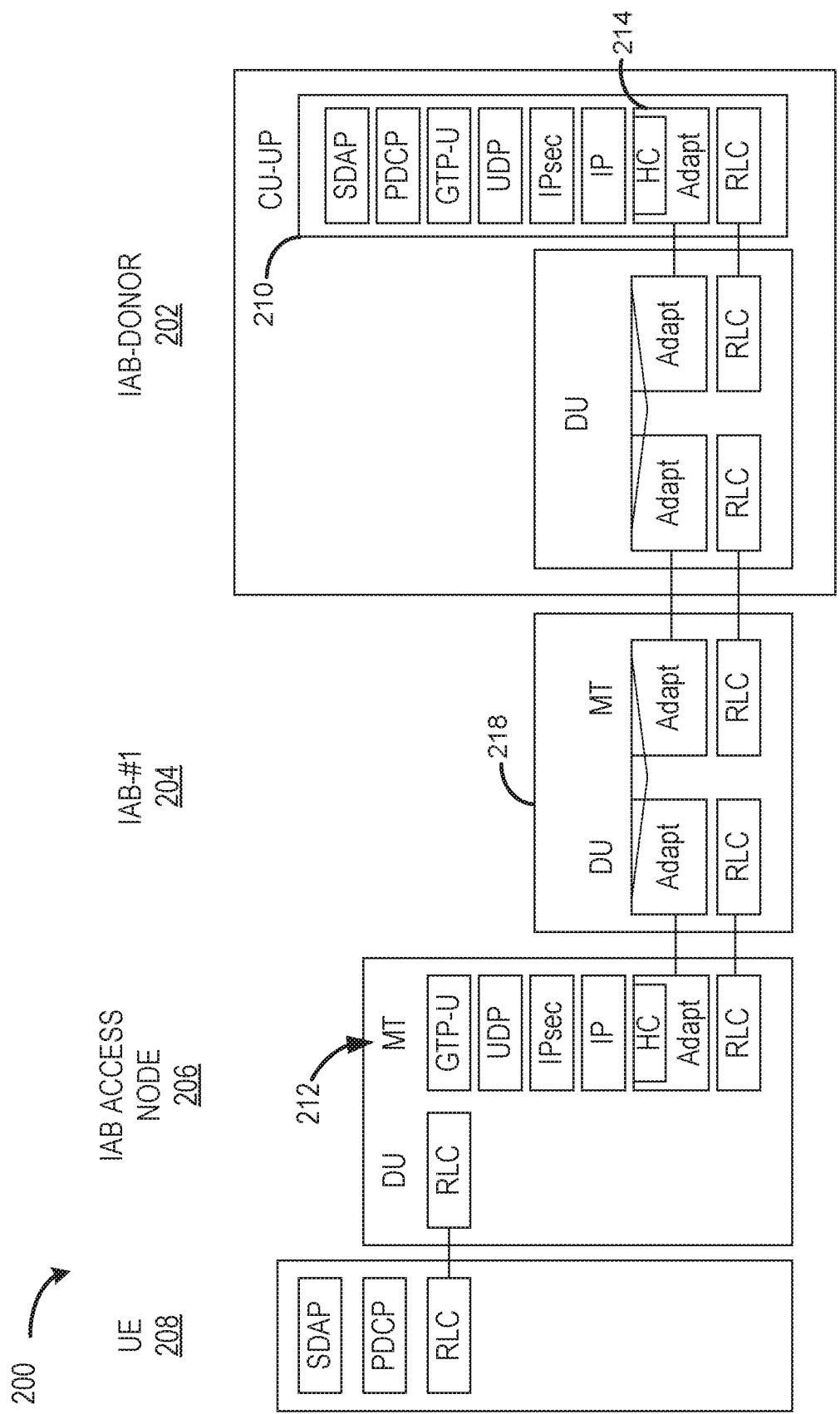
FIG. 2 illustrates an example of UDP/IP header compression over an end-to-end (E2E) backhaul link, according to some implementations of the present disclosure.

FIG. 2 illustrates an example of UDP/IP header compression over an end-to-end (E2E) backhaul link, according to some implementations In this example, an IAB network 200 includes an IAB-Donor 202, an intermediate IAB node 204 (IAB-#1), and an IAB access node 206. As illustrated in FIG. 2, the access IAB node 206 serves a UE 208. In an embodiment, header compression/decompression can be performed in IAB-Donor CU-User Plane (CU-UP) 210 and IAB access node MT 212 for downlink (DL) and/or uplink (UL) packets. More specifically, adaptation layers 214, 216 of the IAB-Donor CU-UP 210 and the IAB access node MT 212, respectively, may be configured with a header compression function for UDP/IP header compression/decompression.

Furthermore, for UE bearers with header compression over the E2E backhaul channel, the compressed packets are exchanged between the respective adaptation layers of the respective DU-MT pair of intermediate IAB nodes and the DU-CU pair of the IAB-Donor, without going through the upper IP layer. For example, as shown in FIG. 2, a compressed packet may be transmitted through the adaptation layers of the DU-MT pair 218 of the IAB-#1 and to the adaptation layers of the DU-CU pair of the IAB-Donor 202, without going through the upper IP layer.

Further, a context identifier associated with each ROHC channel corresponding to a directional E2E backhaul channel between an IAB-Donor CU-UP and an IAB access MT can be used as a routing path ID uniquely allocated within the IAB network under the IAB-Donor CU-UP. It particular the context ID (i.e., the routing path ID) of each UE bearer can be allocated by the IAB-Donor CU and be used as an identifier of that UE bearer. For example, a context identifier associated with an ROHC channel corresponding to the E2E backhaul channel between the IAB-Donor CU-UP 210 and the IAB access node MT 212 can be used as a routing path ID uniquely allocated within the IAB network.

In another implementation of the first method, the ROHC profile used for UDP/IP header compression can be further aggregated with GTP header compression. In this implementation, based on the ROHC framework, the following classes can be used to categorize GTP header fields: INFERRED; STATIC; STATIC-DEF; STATIC-KNOWN; CHANGING INFERRED fields contain values that can be inferred from other values, and thus, do not need to be transmitted. As an example, the size of the frame carrying the packet can be categorized as an INFERRED field. STATIC fields are expected to be constant throughout the lifetime of the packet flow. Static information is communicated once, for example, by an initialisation and refresh (IR) packet. STATIC-DEF fields are STATIC fields whose values define a packet flow. They are generally handled as STATIC. STATIC-KNOWN are STATIC fields that are expected to have known values, and therefore, do not need to be communicated. CHANGING fields are expected to vary in some way (e.g., randomly, within a limited value set or range, or in some other manner).

Table 1 shows the classification of GTP header fields using the described ROHC classification.

Table 1 shows the classification of GTP header fields using the described ROHC classification

| Header Field | Classification |
| --- | --- |
| Version (3 bits) | STATIC-DEF |
| Protocol Type (1 bit) | STATIC-DEF |
| Reserved (1 bit) | STATIC-DEF |
| Extension Header Flag (1 bit) | CHANGING |
| Sequence Number Flag (1 bit) | CHANGING |
| N-PDU Number Flag (1 bit) | STATIC-KNOWN (set to 0) |
| Message Type (8 bits) | CHANGING |
| Tunnel Endpoint Identifier (32 bits) | STATIC-DEF |
| Sequence Number (Optional, 16 bits) | CHANGING if present. |
| N-PDU Number (Optional, 8 bits) | INFERRED |
| Next Extension Header Type (Optional, 8 bits) | CHANGING if present. |

In an embodiment, the number of bits of a context identifier (CID) can be determined based a load of the IAB network, perhaps in terms of the number of contexts required by all UE bearers served by the IAB-Donor. For example, the content ID can be selected from 8 bits, 16 bits and 24 bits depending on the load status of the IAB network. More specifically, an 8 bit context ID can be selected for a low-load IAB network, a 16 bit context ID can be selected for a medium-load IAB network, and a 24 bit context ID can be selected for a large-load IAB network. The thresholds for each type of load may be predetermined In the case of a low-load IAB network, the compression efficiency by virtue of having a CID of 8 bits (and therefore header size is reduced from 64 bits to 34 bits) may reach nearly 50%. Moreover, a message type field (e.g., of 8 bits) can be further compressed if a new message type definition is used for NR IAB network, which then allows removal of messages used for other radio access network (RAN) systems.

Method 2: Header Compression Per BH Link Between Adjacent IAB Nodes

In a second method, header compression can be configured independently over the respective backhaul channels of each hop in the IAB network.

Figure 3:
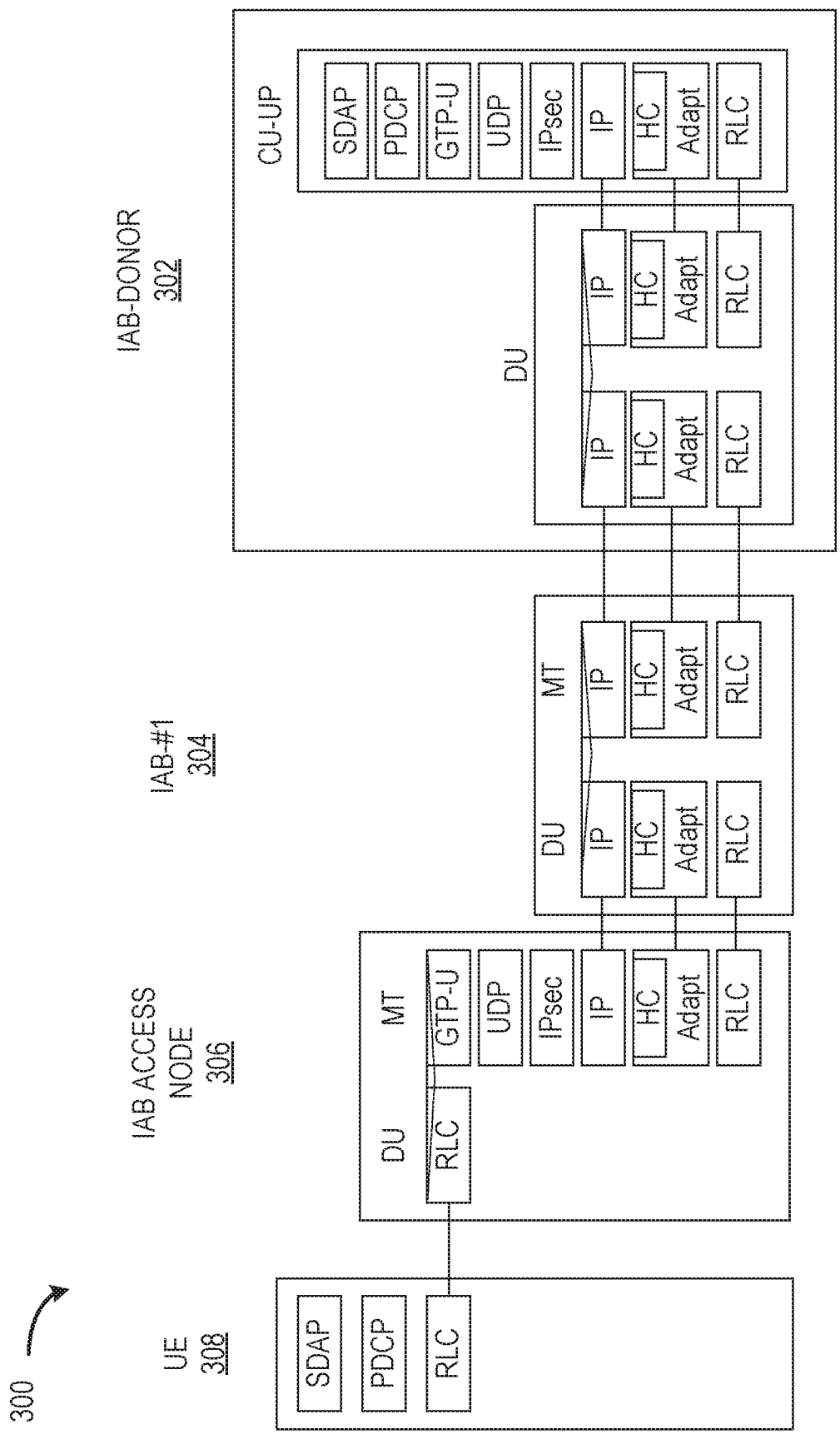
FIG. 3 illustrates an example 300 of header compression per backhaul link between adjacent IAB nodes, according to some implementations of the present disclosure.

FIG. 3 illustrates an example 300 of header compression per backhaul link between adjacent IAB nodes, according to some implementations. In this example, an IAB network 300 includes an IAB-Donor 302, an intermediate IAB node 304 (IAB-#1), and an IAB access node 306. As illustrated in FIG. 3, the access IAB node 306 serves a UE 308. In an embodiment, the header compression functionality can be configured for the adaption layers of the IAB nodes of the IAB network 300. As shown in FIG. 3, the adaptation layers of the IAB-Donor 302, the intermediate IAB node 304, and the IAB access node 306 may be configured with a header compression functionality. Because intermediate IAB nodes and IAB-Donor DU only have access to the IP layer of traffic flows, the header compression functionality can only perform IP header compression, e.g., based on RFC 3843, RFC 4815 and RFC 5225. Within examples, the IAB network 300 may execute the second method in order to implement header compression over one or more backhaul channels between IAB nodes of the IAB network 300.

In an embodiment, whether header compression is performed for a particular backhaul hop depends on the achievable compression efficiency for that hop. As such, within an IAB network, header compression can be performed for some backhaul hops and not others. In an example, the achievable compression efficiency for a backhaul channel (e.g., for a hop of the IAB network) may be determined based on a configured context identifier associated with the adaptation layer entity of a particular IAB node. For instance, the configured context identifier for the adaptation layer entity of a particular IAB node can correspond to the local path ID used by the IAB node. As such, for IAB nodes serving a small number of child nodes, the length of CID can be small and lead to a better compression efficiency. On the other hand, for an IAB node serving large number of child nodes (e.g., IAB-Donor), the size of required CID if HC is configured can be large, and thus, an acceptable compression efficiency is less likely. In this case, whether to use header compression can depend on the achievable compression efficiency.

For one or more embodiments, at least one of the components set forth in one or more of the preceding figures may be configured to perform one or more operations, techniques, processes, and/or methods as set forth in the example section below. As an example, the baseband circuitry as described above in connection with one or more of the preceding figures may be configured to operate in accordance with one or more of the examples set forth below. As another example, circuitry associated with a UE, base station, network element, etc. as described above in connection with one or more of the preceding figures may be configured to operate in accordance with one or more of the examples set forth below in the example section.

Figure 4:
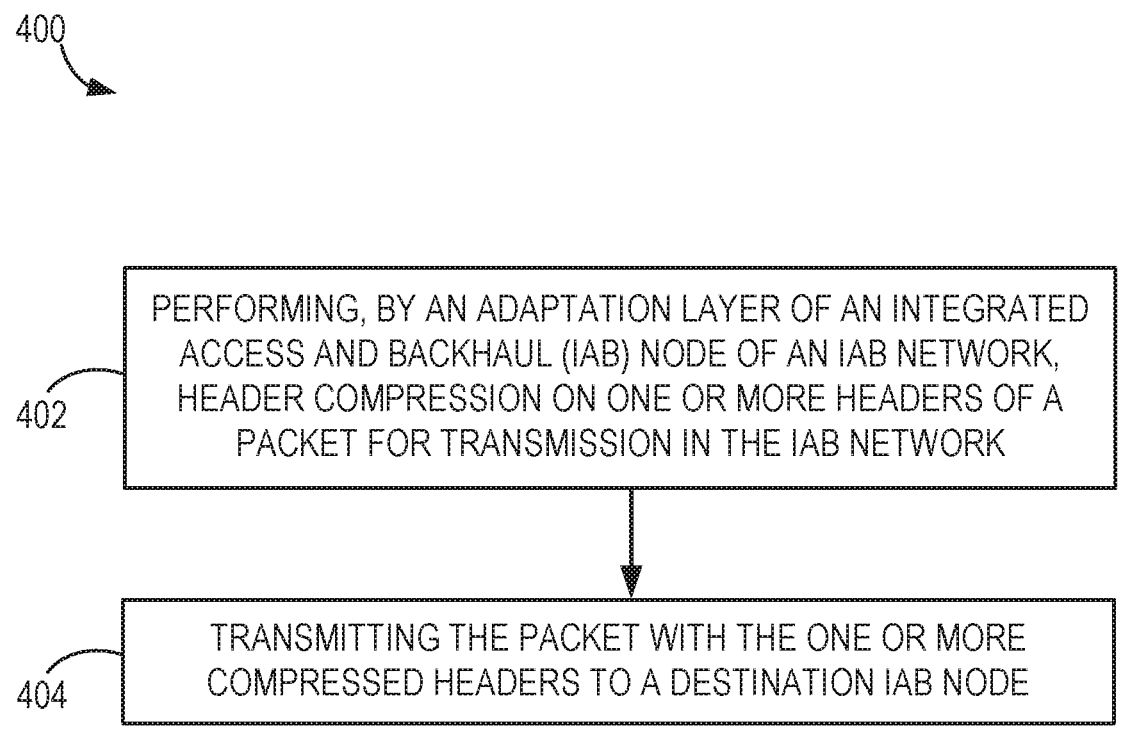
FIG. 4 illustrates a flowchart of an example method, according to some implementations of the present disclosure.

FIG. 4 illustrates a flowchart of an example process 400, according to some implementations. For clarity of presentation, the description that follows generally describes the processes in the context of the other figures in this description. For example, process 400 can be performed by an IAB node or entity thereof (e.g., an IAB node of FIG. 1, 2, or 3). However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 4 is a flowchart of an example process 400 for header compression in an IAB network. At step 402, the process involves performing, by an adaptation layer of an IAB node, header compression on one or more headers of a packet for transmission in the IAB network. At step 404, the process involves transmitting the packet with the compressed one or more headers to a destination IAB node. Note that the example process 400 and the description herein can be adapted for header decompression. For example, upon receipt of the compressed packet, the destination IAB may perform header decompression on the one or more headers of the compressed packet.

In some implementations, the packet is transmitted via a user equipment (UE) bearer, and the IAB network implements UE bearer to backhaul channel mapping and routing.

In some implementations, the one or more headers are at least one of a General Packet Radio Service (GPRS) Tunneling Protocol (GTP) header, a User Datagram Protocol (UDP) header, or an Internet Protocol (IP) header.

In some implementations, performing header compression on the one or more headers includes compressing a message type field in the one or more headers.

In some implementations, the header compression is based on a Robust Header Compression (ROHC) framework, and the header compression is performed using an ROHC compression profile.

In some implementations, performing header compression on the one or more headers includes: determining a load status of the IAB network with respect to a number of contexts required by UE bearers served by the IAB network; and determining, based on the load status, a context identifier of an ROHC channel, wherein a number of bits of the context identifier is one of 8 bits, 16 bits, or 24 bits.

In some implementations, an ROHC channel corresponds to an end-to-end backhaul link between the IAB node and the destination IAB node, and the process further includes: determining, based on the context identifier, a routing path ID of the end-to-end backhaul link, wherein the rowing path ID identifies each hop in the end-to-end backhaul link between the IAB node and the destination IAB node.

In some implementations, the packet is transmitted over an end-to-end backhaul link between an IAB-Donor and an IAB access node, the IAB node is one of the IAB-Donor and the IAB access node, and the destination IAB node is the other one of the IAB-Donor and the IAB access node.

In some implementations, the IAB network further includes an intermediate node between the IAB-Donor and the IAB access node, and the process further includes: routing the packet through adaptation layers of the intermediate IAB node and the IAB-Donor node, where the packet is routed through the adaptation layers without going through the upper Internet Protocol (IP) layer.

In some implementations, the one or more headers are at least one of a User Datagram Protocol (UDP) header or an Internet Protocol (IP) header, and the header compression of the UDP header or the IP header is UDP/IP header compression that uses a Robust Header Compression (ROHC) framework.

In some implementations, the one or more headers further include a General Packet Radio Service (GPRS) Tunneling Protocol (GTP) header, and the UDP/IP header compression is aggregated with GTP header compression.

In some implementations, the process further includes: categorizing GTP header fields based on the ROHC framework by assigning each GTP header field to one of the following categories: INFERRED, STATIC, STATIC-DEF, STATIC-KNOWN, and CHANGING.

In some implementations, the header compression is configured independently over a respective backhaul link in each hop between the IAB node and the destination IAB node.

In some implementations, the process further includes determining respective compression efficiencies for the backhaul links between the IAB node and the destination IAB node.

In some implementations, the process further includes: determining, based the respective compression efficiency of a first backhaul link, whether to perform header compression over the first backhaul link.

The example process shown in FIG. 4 can be modified or reconfigured to it include additional, fewer, or different steps (not shown in FIG. 4), which can be performed in the order shown or in a different order.

Figure 5:
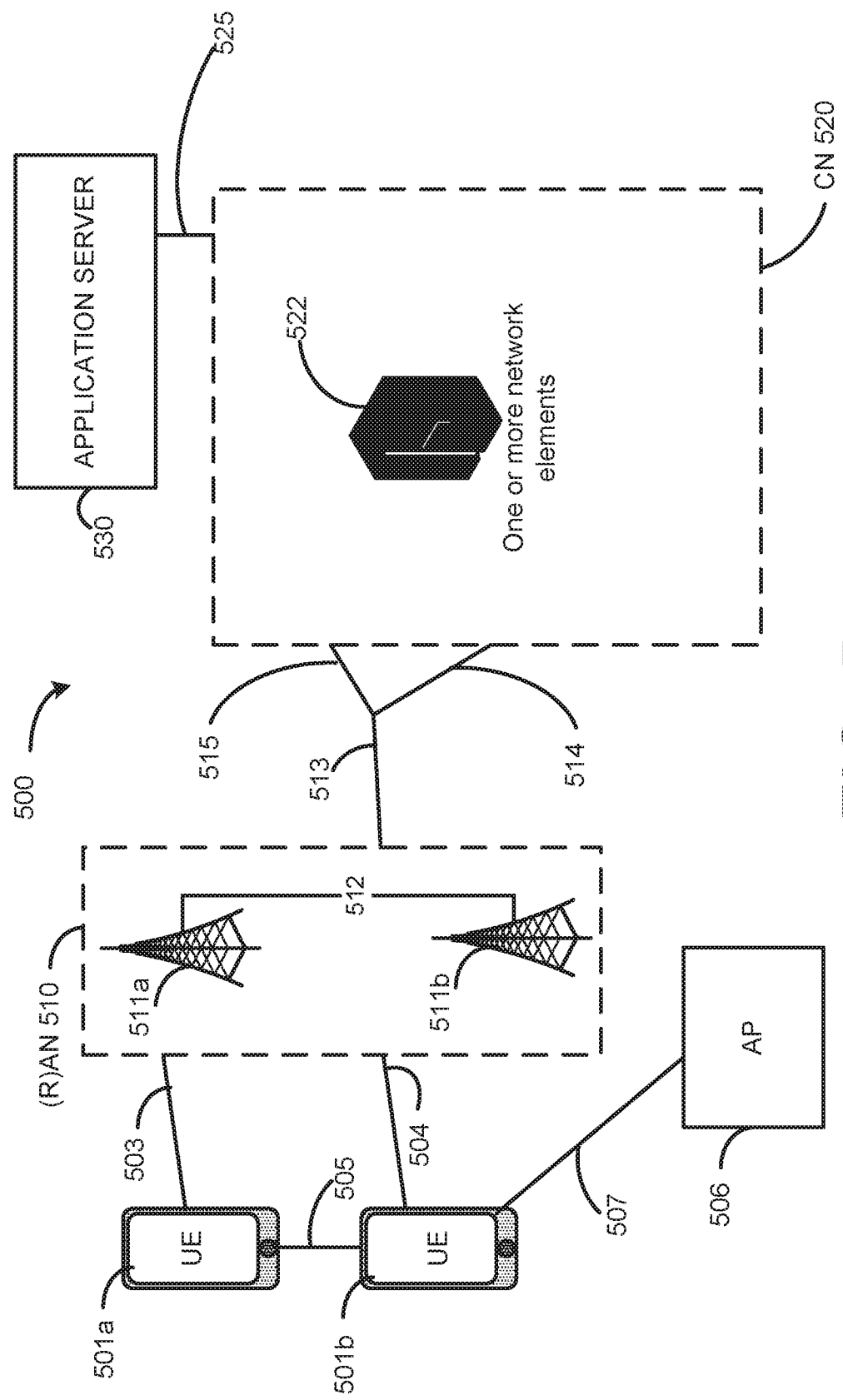
FIG. 5 illustrates an example architecture of a system of a network, according to some implementations of the present disclosure.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g. Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontroller, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MIC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the it connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 310 that operates in an LTE or 4G system 500. The UEs 501 utilize connections (or channels) 503 and 504, respectively, each of which comprises a physical communications interface or layer (discussed in further detail below).

In this example, the connections 303 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 305. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 500b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 7), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which am RAN nodes that provide E-UTRA user plane and control plane protocol terminations toward the UEs 501, and are connected to a 5GC via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range wo Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements, in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LRT mechanism designed for LAA is somewhat similar to the CSMA/CA of WLAN. In some implementations, the LBT procedure for DL or UL transmission bunts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1, 4, 3, 5, 10, 15 or 20 MHz and a maximum of five CCs can be aggregated, and therefore, a maximum aggregated bandwidth is 100 MHz. In FDD systems, the number of aggregated carriers can be different tor DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being to mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system (e.g. when CN 520 is an EPC 620 as in FIG. 6), the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system, the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a cue network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in tone physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below) A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VoIP sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 313 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6:
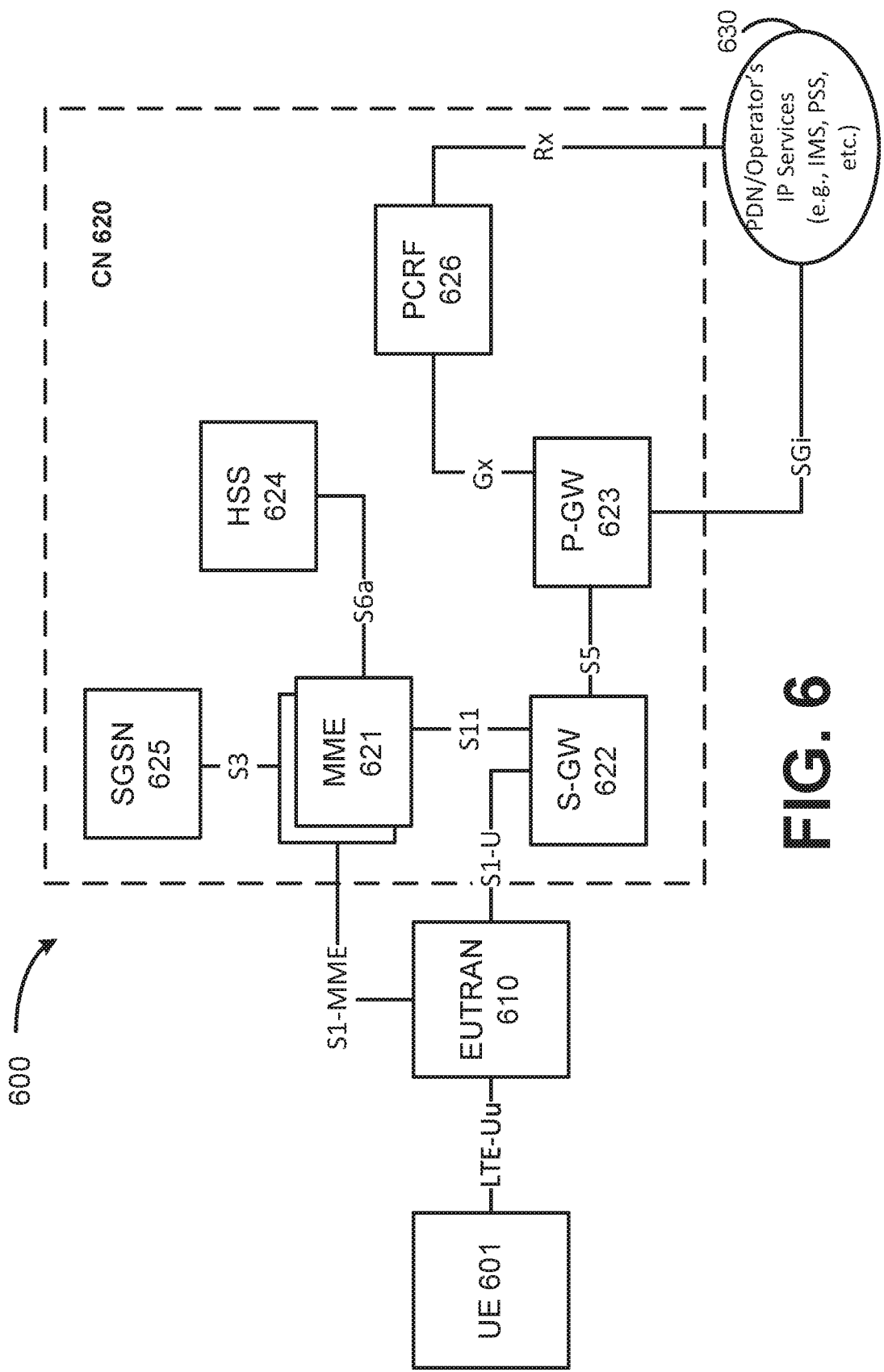
FIG. 6 illustrates an example architecture of a system including a CN, according to some implementations of the present disclosure.

FIG. 6 illustrates an example architecture of a system 600 including a first CN 620, in accordance with various embodiments. In this example, system 600 may implement the LTE standard wherein the CN 620 is an EPC 620 that corresponds with CN 520 of FIG. 5. Additionally, the UE 601 may be the same or similar as the UEs 50 of FIG. 5, and the E-UTRAN 610 may be a RAN that is the same or similar to the RAN 510 of FIG. 5, and which may include RAN nodes 511 discussed previously. The CN 620 may comprise MMEs 621, an S-GW 622, a P-GW 623, a HSS 624, and a SGSN 625.

The MMEs 621 may be similar in function to the control plane of legacy SGSN, and may implement MM functions to keep track of the current location of a UE 601. The MMEs 621 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 601, provide user identity confidentiality, and/or perform other like services to users/subscribers. Each UE 601 and the MME 621 may include an MM or EMM sublayer, and an MM context may be established in the UE 601 and the MME 621 when an attach procedure is successfully completed. The MM context may be a data structure or database object that stores MM-related information of the UE 601. The MMEs 621 may be coupled with the HSS 624 via an S6a reference point, coupled with the SGSN 625 via an S3 reference point, and coupled with the S-GW 622 via an S11 reference point.

The SGSN 625 may be a node that serves the UE 601 by tracking the location of an individual UE 601 and performing security functions. In addition, the SGSN 625 may perform Inter-EPC node signaling for mobility between 2G/3G and E-UTRAN 3GPP access networks; PDN and S-GW selection as specified by the MMEs 621; handling of UE 601 time zone functions as specified by the MMEs 621; and MME selection for handovers to E-UTRAN 3GPP access network. The S3 reference point between the MMEs 621 and the SGSN 625 may enable user and bearer information exchange for inter-3GPP access network mobility in idle and/or active states.

The HSS 624 may comprise a database for network users, including subscription-related information to support the network entities' handling of communication sessions. The EPC 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc. An S6a reference point between the HSS 624 and the MMEs 621 may enable transfer of subscription and authentication data for authenticating/authorizing user access to the EPC 620 between HSS 624 and the MMEs 621.

The S-GW 622 may terminate the S1 interface 513 ("S1-U" in FIG. 6) toward the RAN 610, and routes data packets between the RAN 610 and the E-PC 620. In addition, the S-GW 622 may be a local mobility anchor point for inter-RAN node handovers and also may provide an anchor for inter-3GPP mobility. Other responsibilities may include lawful intercept, charging, and some policy enforcement. The S11 reference point between the S-GW 622 and the MMEs 621 may provide a control plane between the MMEs 621 and the S-GW 622. The S-GW 622 may be coupled with the P-GW 623 via an S5 reference point.

The P-GW 623 may terminate an SGi interface toward a PDN 630. The P-GW 623 may route data packets between the EPC 620 and external networks such as a network including the application server 530 (alternatively referred to as an "AF") via an IP interface 525 (see e.g., FIG. 5). In embodiments, the P-GW 623 may be communicatively coupled to an application server (application server 530 of FIG. 5 or PDN 630 in FIG. 6) via an IP communications interface 525 (see e.g. FIG. 5). The S5 reference point between the P-GW 623 and the S-GW 622 may provide user plane tunneling and tunnel management between the P-GW 623 and the S-GW 622. The S5 reference point may also be used for S-GW 622 relocation due to UE 601 mobility and if the S-GW 622 needs to connect to a non-collocated P-GW 623 for the required PDN connectivity. The P-GW 623 may further include a nude for policy enforcement and charging data collection (e.g., PCEF (not shown)). Additionally, the SGi reference point between the P-GW 623 and the packet data network (PDN) 630 may be an operator external public, a private PDN, or an intra operator packet data network, for example, for provision of MS services. The P-GW 623 may be coupled with a PCRF 626 via a Gx reference point.

PCRF 626 is the policy and charging control element of the EPC 620. In a non-roaming scenario, there may be a single PCRF 626 in the Home Public Land Mobile Network (HPLMN) associated with a UE 601's Internet Protocol Connectivity Access Network (IP-CAN) session. In a roaming scenario with local breakout of traffic, there may be two PCRFs associated with a UE 601's IP-CAN session, a Home PCRF (H-PCRF) within an HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate QoS and charging parameters. The PCRF 626 may provision this rule into a PCEF (not shown) with the appropriate TFT and QCI, which commences the QoS and charging as specified by the application server 630. The Gx reference point between the PCRF 626 and the P-GW 623 may allow for the transfer of QoS policy and charging rules from the PCRF 626 to PCEF in the P-GW 623. An Rx reference point may reside between the PDN 630 (or "AF 630") and the PCRF 626.

Figure 7:
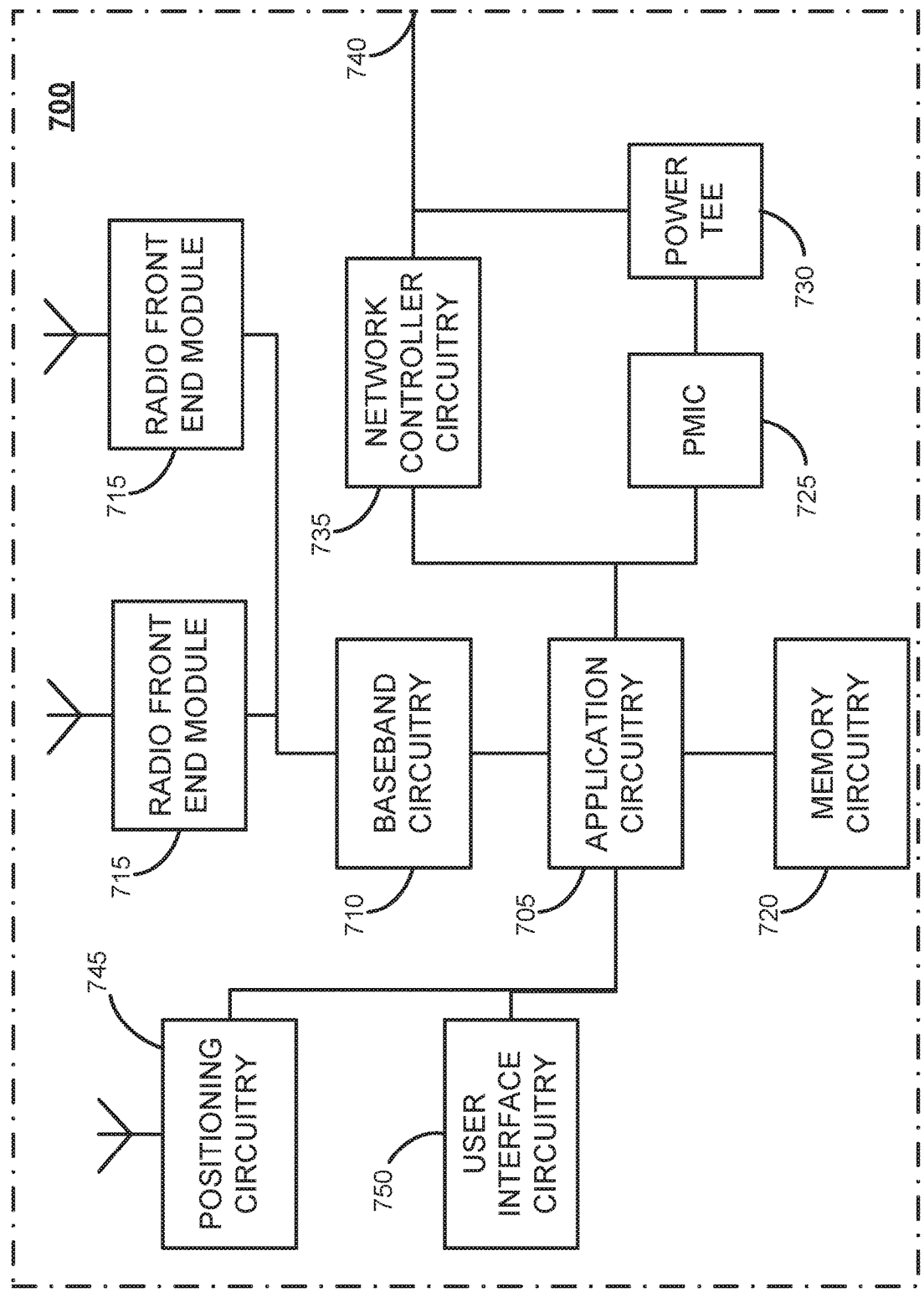
FIG. 7 illustrates a block diagram of an example of infrastructure equipment, according to some implementations of the present disclosure.

FIG. 7 illustrates an example of infrastructure equipment 700 in accordance with various embodiments. The infrastructure equipment 700 (or "system 700") may be implemented as a base station, radio head, RAN node such as the RAN nodes 511 and/or AP 506 shown and described previously, application server(s) 530, and/or any other element-device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, die components described below may be included in more than one device. For example, said circuitries may be separately included in more than one device for CRAN, vBBU, or other like implementations.

Application circuitry 705 includes circuitry such as, but not limited to one or more processors (or processor cures), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interface, Mobile Industry Processor Interface (MIPI) interfaces and Joint Test Access Group (JTAG) test access ports. The processors (or cores) of the application circuitry 705 may be coupled with or may include memory/ storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or mom a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), eclectically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits.

User interface circuitry 740 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a pointer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 713 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards.

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 700 via network interface connector 740 using a physical connection, which may be electrical (commonly referred to as a "copper interconnect") optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g. including hardware devices such as switches, filters, amplifiers, antenna elements, and the like to facilitate OTA communications) to communicate with components of a positioning network, such as navigation satellite constellation nodes. In some embodiments, the positioning circuitry 740 may include a Micro-Technology for Positioning, Navigation, and Timing (Micro-PNT) IC that uses a master timing clock to perform position tracking/estimation without GNSS assistance. The positioning circuitry 745 may also be pan of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., RAN nodes 511, etc.), or the like.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx). PCI express (PCIe), or any number of other technologies. The bus/IX may be a proprietary bus, for example, used in a SoC based system. Other bus/IX systems may be included, such as an I2C interface, an SPI interface, point to point interfaces and a power bus, among others.

Figure 8:
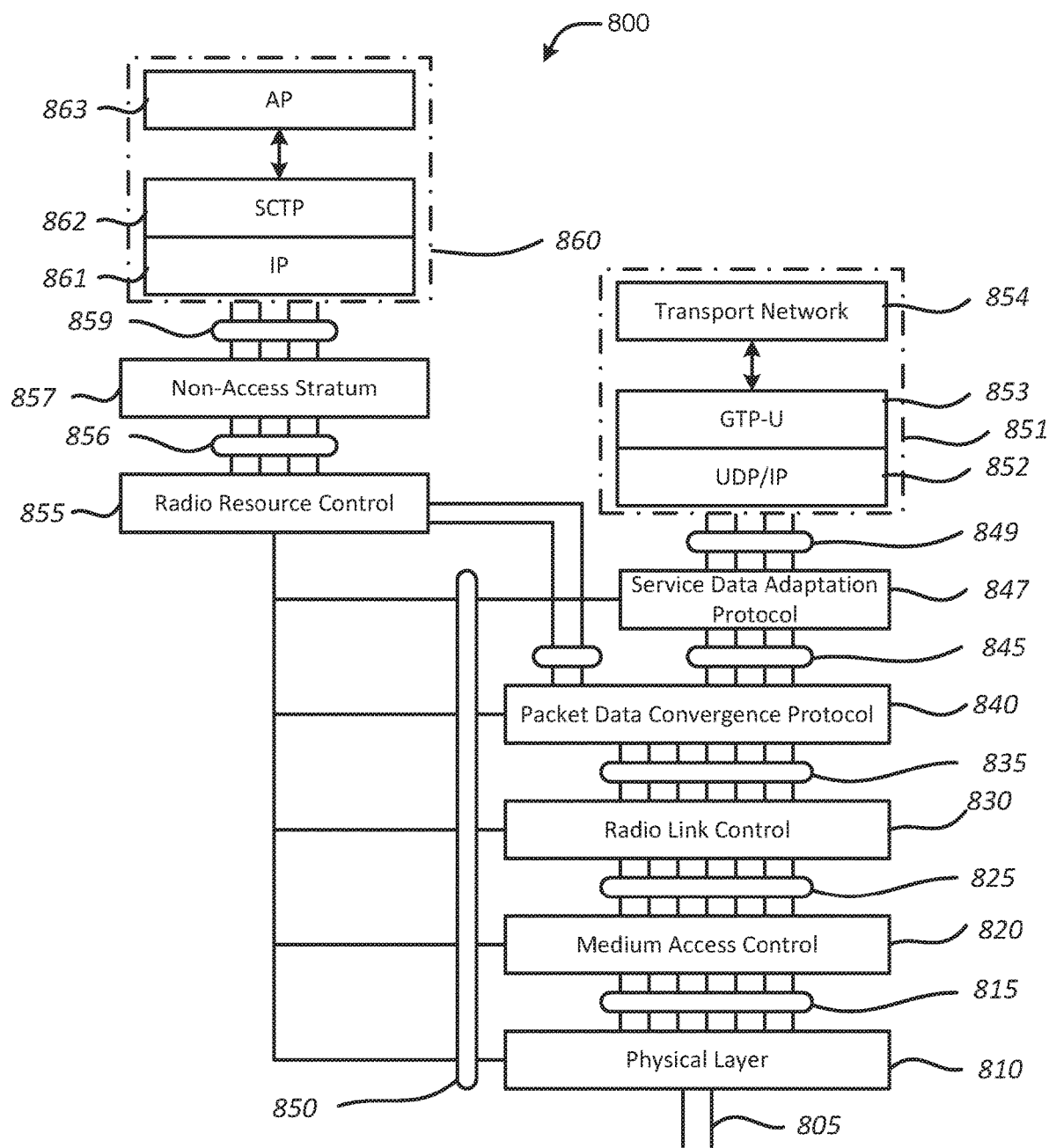
FIG. 8 illustrates a block diagram of various protocol functions that may be implemented in a wireless communication device, according to some implementations of the present disclosure.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 1015 in FIG. 8) that may provide communication between two or more protocol layers.

The PHY 1010 may transmit and receive physical layer signals 805 that may be received from or transmitted to one or more other communication devices. The physical layer signals 805 may comprise one or more physical channels, such as those discussed herein. The PHY 1010 may further perform link adaptation or adaptive modulation and coding (AMC), power control, cell search (e.g., for initial synchronization and handover purposes), and other measurements used by higher layers, such as the RRC 855. The PHY 1010 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1010 may process requests from and provide indications to an instance of MAC 820 via one or mom PHY-SAP 1015. According to some embodiments, requests and indications communicated via PHY-SAP 1015 may comprise one or more transport channels.

Instance(s) of MAC 820 may process requests from, and provide indications to, an instance of RLC 830 via one or mom MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error connection through HARQ, and logical channel prioritization.

Instance(s) of RLC 830 may process requests from and provide indications to an instance of PDCP 40 via one or more radio link control service access points (RLC-SAP) 835. These requests and indications communicated via RLC-SAP 835 may comprise one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets A single SDAP entity 847 may be configured for an individual PDU session. In the UL direction, the NG-RAN 510 may control the mapping of QoS Flows to DRB(s) in two different ways, reflective mapping or explicit mapping. For reflective mapping, the SDAP 847 of a UE 501 may monitor the QFIs of the DL packets for each DRB, and may apply the same mapping for packets flowing in the UL direction. For a DRB, the SDAP 847 of the UE 501 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 1010, MAC 820, RLC 830, PDCP 840 and SDAP 847. In embodiments, an instance of RRC 835 may process requests from and provide indications to one or more NAS entities 857 via one or more RRC-SAPs 856. The main services and functions of the RRC 855 may include broadcast of system information (e.g., included in MIBs or SIBs related to the NAS) broadcast of system information so related to the access stratum (AS), paging, establishment, maintenance and release of an RRC connection between the UE 501 and RAN 510 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 857 may form the highest stratum of the control plane between the UE 501 and the AMF The NAS 857 may support the mobility of the UEs 501 and the session management procedures to establish and maintain IP connectivity between the UE 501 and a P-GW in LTE systems.

According to various embodiments, one or more protocol entities of arrangement 800 may be implemented in UEs 501, RAN nudes 511, AMF in NR implementations or MME 621 in LTE implementations, UPF in NR implementations or S-GW 622 and P-GW 623 in LTE implementations, or the like to be used for control plane or user plane communications protocol stack between the aforementioned devices. In such embodiments, one or more protocol entities that may be implemented in one or more of UE 501, gNB 511, AMP, etc. may communicate with a respective peer protocol entity that may be implemented in or on another device using the services of respective lower layer protocol entities to perform such communication. In some embodiments, a gNB-CU of the gNB 511 may best the RRC 855, SDAP 847, and PDCP 840 of the gNB that controls the operation of one or more gNB-DUs, ad the gNB-DUs of the gNB 511 may each host the RLC 330, MAC 820, and PHY 1010 of the gNB 511.

In a first example, a control plane protocol stack may comprise, in order from highest layer to lowest layer, NAS 1057, RRC 1055, PDCP 840, RLC 830, MAC 1020, and PHY 1010. In this example, upper layers 860 may be built on top of the NAS 1057, which includes an IP layer 861, an SCTP 862, and an application layer signaling protocol (AP) 863.

In NR implementations, the AP 863 may be an NG application protocol layer (NGAP or NG-AP) 363 for the NG interface 513 defined between the NG-RAN node 511 and the AMF, or the AP 863 may be an Xn application protocol layer (XnAP or Xn-AP) 863 for the Xn interface 512 that is defined between two or more RAN nodes 511.

The NG-AP 863 may support the functions of the NG interface 513 and may comprise Elementary Procedures (EPs). An NG-AP EP may be a unit of interaction between the NG-RAN node 511 and the AMF. The NG-AP 863 services may comprise two groups UE-associated service (e.g., services related to a UE 501) and non-UE-associated services (e.g., services related to the whole NG interface instance between the NG-RAN node 511 and AMF). These services may include functions including, but not limited to: a paging function for the sending of paging requests to NG-RAN nodes 511 involved in a particular paging area; a UE context management function for allowing the AMF to establish, modify, and/or release a UE context in the AMF and the NG-RAN node 511; a mobility function for UEs 501 in ECM-CONNECTED mode for intra-system HOs to support mobility within NG-RAN and inter-system HOs to support mobility from/to EPS systems; a NAS Signaling Transport function for transporting or rerouting NAS messages between UE 501 and AMF; a NAS node selection function for determining an association between the AMF and the UE 501; NG interface management function(s) for setting up the NG interface and monitoring for errors over the NG interface; a warning massage transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 511 via CN 520; and/or other like functions.

The XnAP 863 may support the functions of the Xn interface 512 and may comprise XnAP basic mobility procedures and XnAP global procedures. The XnAP basic mobility procedures may comprise procedures used to handle UE mobility within the NG RAN 511 (or E-UTRAN 610), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 501, such as Xn interface setup and reset procedures, NG-RAN update procedures, cell activation procedures, and the like.

In LTE implementations, the AP 863 may be an S1 Application Protocol layer (S1-AP) 863 for the S1 interface 513 defined between an E-UTRAN node 511 and an MME, or the AP 863 may be an X2 application protocol layer (X2AP or X2-AP) 863 for the X2 interface 512 that is defined between two or more E-UTRAN nodes 511.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 511 and an MME 621 within an LTE CN 520. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 512 and may comprise X2AP basic mobility procedures and X2AP global procedures. The X2AP basic mobility procedures may comprise procedures used to handle UE mobility within the E-UTRAN 520, such as handover preparation and cancellation procedures, SN Status Transfer procedures. UE context retrieval and UE context release procedures, RAN paging procedures, dual connectivity related procedures, and the like. The X2AP global procedures may comprise procedures that are not related to a specific UE 501, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages wo between the RAN node 511 and the AMF/MME 621 based, in part, on the IP protocol, supported by the IP 361. The Internet Protocol layer (IP) 861 may be used to perform packet addressing and routing functionality. In some implementations the IP layer 861 may use point-to-point transmission to deliver and convey PDUs. In this regard, the RAN node 511 may comprise L2 and L1 layer communication links (e.g., wired or wireless) with the MME/AMF to exchange information.

In a second example, a user plans protocol stack may comprise, in order from highest layer to lowest layer, SDAP 847, PDCP 840, RLC 830, MAC 1020, and PHY 1010. The user plane protocol stack may be used for communication between the UE 501, the RAN node 511, and UPF in NR implementations or an S-GW 622 and P-GW 623 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 511 and the S-GW 622 may utilize an S1-U interface to exchange user plane data via a protocol stack comprising an L1 layer (e.g., PHY 1010), an L2 layer (e.g., MAC 820, RLC 830, PDCP 840, and/or SDAP 847), the UDP/IP layer 852, and the GTP-U 853. The S-GW 622 and the P-GW 623 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 501 and the session management procedures to establish and maintain IP connectivity between the UE 501 and the P-GW 623.

Moreover, although not shown by FIG. 8, an application layer may be present above the AP 363 and/or the transport network layer 854. The application layer may be a layer in which a user of the UE 501, RAN node 511, or other network element interacts with software applications being executed, for example, by application circuitry 705 or application circuitry 805, respectively. The application layer may also provide one or more interfaces for software applications to interact with communications systems of the UE 501 or RAN node 511. In some implementations the IP layer and/or the application layer may provide the same or similar functionality as layers 5-7, or portions thereof, of the Open Systems Interconnection (OSI) model (e.g., OSI Layer 7—the application layer, OSI Layer 6— the presentation layer, and OSI Layer 5—the session layer).

Figure 9:
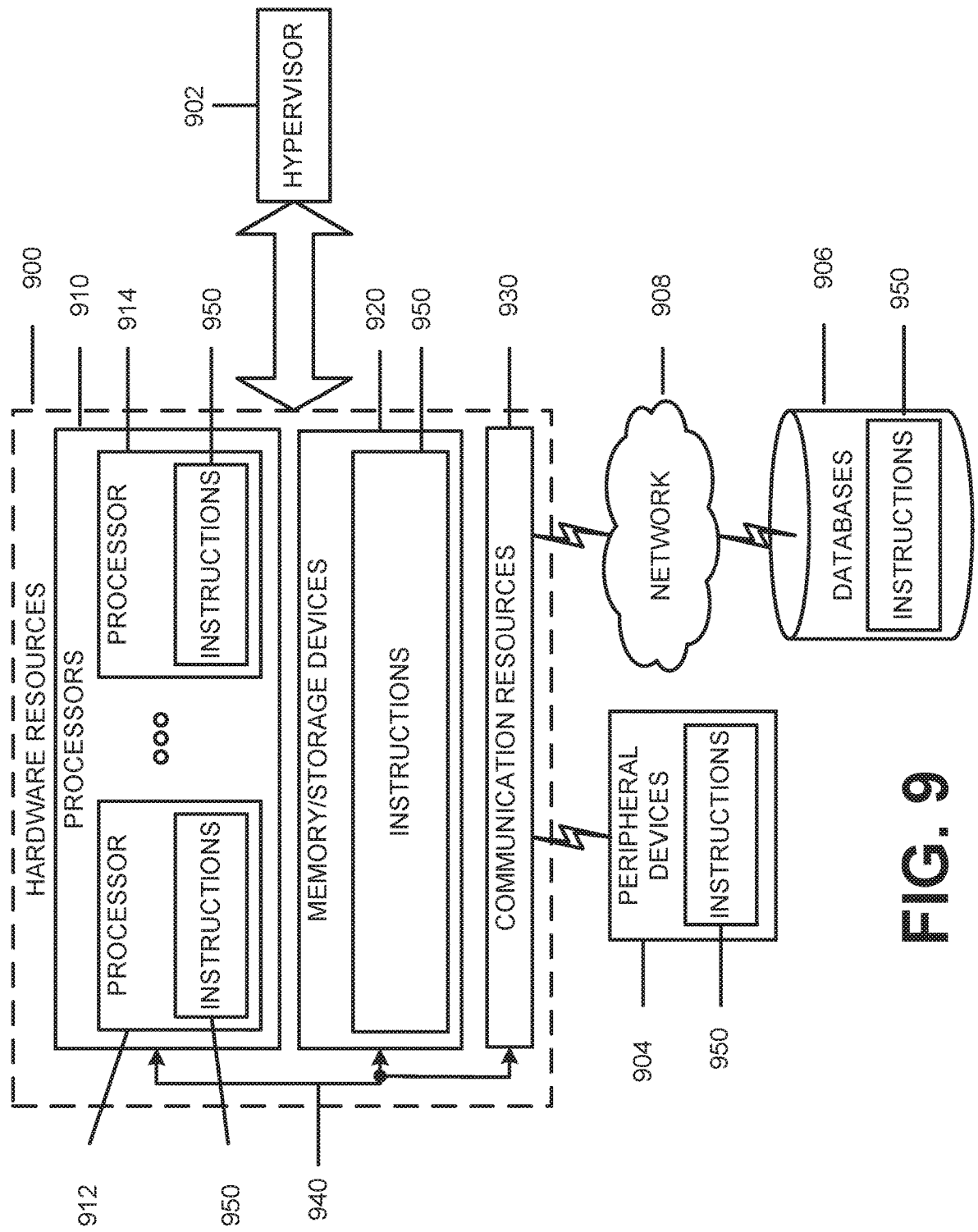
FIG. 9 illustrates a block diagram illustrating components able to read instructions from a machine-readable or computer-readable medium (e.g., a non-transitory machine-readable storage medium) and perform any one or more of the methodologies described herein, according to some implementations of the present disclosure.

FIG. 9 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one it or more communication resources 930, each of which may be communicatively coupled via a bus 940. For embodiments where node virtualization (e.g., NFV) is utilized, a hypervisor 902 may be executed to provide an execution environment for one or more network slices/sub-slices to utilize the hardware resources 900.

The processors 910 may include, for example, a processor 912 and a processor 914. The processor(s) 910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 920 may include main memory, disk storage, or any suitable combination thereof. The memory/storage devices 920 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 930 may include interconnection or network interface components or other suitable devices to communicate with one or more peripheral devices 904 or one or more databases 906 via a network 908. For example, the communication resources 930 may include wired communication components (e.g., for coupling via USB), cellular communication components, NFC components, Bluetooth® (or Bluetooth® Low Energy) components, Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 or the databases 906. Accordingly, the memory of processors 910, the memory/storage devices 920, the peripheral devices 904, and the databases 906 are examples of computer-readable and machine-readable media.

What is claimed is:

1. In an integrated access and backhaul (IAB) network comprising an IAB node, a method comprising:
    performing, by an adaptation layer of the IAB node, an end-to-end header compression on one or more headers of a packet for transmission over an end-to-end backhaul link in the IAB network between the IAB node and a destination IAB access node, wherein performing header compression on the one or more headers comprises:
        determining a load status of the IAB network with respect to a number of contexts required by UE bearers served by the IAB network; and
        determining, based on the load status, a context identifier of an ROHC channel,
    wherein a number of bits of the context identifier is one of 8 bits, 16 bits, or 24 bits; and
    transmitting the packet with the one or more compressed headers over the end-to-end backhaul link to the destination IAB access node.

2. The method of claim 1, wherein the packet is transmitted via a user equipment (UE) bearer, and wherein the IAB network implements UE bearer to backhaul channel mapping and routing.

3. The method of claim 1, wherein the one or more headers are at least one of a General Packet Radio Service (GPRS) Tunneling Protocol (GTP) header, a User Datagram Protocol (UDP) header, or an Internet Protocol (IP) header.

4. The method of claim 1, wherein performing header compression on the one or more headers comprises compressing a message type field in the one or more headers.

5. The method of claim 1, wherein the header compression is based on a Robust Header Compression (ROHC) framework, and wherein the header compression is performed using an ROHC compression profile.

6. The method of claim 1, wherein the ROHC channel corresponds to the end-to-end backhaul link between the IAB node and the destination IAB access node, and wherein the method further comprises:
    determining, based on the context identifier, a routing path ID of the end-to-end backhaul link, wherein the routing path ID identifies each hop in the end-to-end backhaul link between the IAB node and the destination IAB access node.

7. The method of claim 1, wherein the IAB node is an IAB-Donor, and wherein the packet is transmitted over the end-to-end backhaul link between the IAB-Donor and the destination IAB access node.

8. The method of claim 7, wherein the IAB network further comprises an intermediate IAB node between the IAB-Donor and the destination IAB access node, and wherein the method further comprises:
    routing the packet through adaptation layers of the intermediate IAB node and the IAB-Donor node, wherein the packet is routed through the adaptation layers without going through an upper Internet Protocol (IP) layer.

9. The method of claim 7, wherein the one or more headers are at least one of a User Datagram Protocol (UDP) header or an Internet Protocol (IP) header, and wherein the header compression of the UDP header or the IP header is UDP/IP header compression that uses a Robust Header Compression (ROHC) framework.

10. The method of claim 9, wherein the one or more headers further comprises a General Packet Radio Service (GPRS) Tunneling Protocol (GTP) header, and wherein the UDP/IP header compression is aggregated with GTP header compression.

11. The method of claim 10, further comprising:
categorizing GTP header fields based on the ROHC framework by assigning each GTP header field to one of the following categories: INFERRED, STATIC, STATIC-DEF, STATIC-KNOWN, and CHANGING.

12. In an integrated access and backhaul (IAB) network comprising an IAB node, one or more processors configured to perform operations comprising:
performing, by an adaptation layer of the IAB node, header compression on one or more headers of a packet for transmission in the IAB network;
determining a respective compression efficiency for a respective backhaul link in each hop between the IAB node and a destination IAB node; and
transmitting the packet with the one or more compressed headers to the destination IAB node, wherein the header compression is configured independently over the respective backhaul link in each hop between the IAB node and the destination IAB node.

13. The one or more processors of claim 12, wherein the one or more headers are at least one of a General Packet Radio Service (GPRS) Tunneling Protocol (GTP) header, a User Datagram Protocol (UDP) header, or an Internet Protocol (IP) header.

14. The one or more processors of claim 12, wherein performing header compression on the one or more headers comprises compressing a message type field in the one or more headers.

15. The one or more processors of claim 12, wherein the header compression is based on a Robust Header Compression (ROHC) framework, and wherein the header compression is performed using an ROHC compression profile.

16. An integrated access and backhaul (IAB) system comprising:
an IAB node; and
one or more processors and one or more storage devices storing instructions that are operable, when executed by the one or more processors, to cause the one or more processors to perform operations comprising:
performing, by an adaptation layer of the IAB node, header compression on one or more headers of a packet for transmission in the IAB system;
determining a respective compression efficiency for a respective backhaul link in each hop between the IAB node and a destination IAB node; and
transmitting the packet with the one or more compressed headers to the destination IAB node, wherein the header compression is configured independently over the respective backhaul link in each hop between the IAB node and the destination IAB node.

17. The IAB system of claim 16, the operations further comprising:
determining, based at least on the respective compression efficiency of a first backhaul link, whether to perform header compression over the first backhaul link.

* * * * *